(12) United States Patent
Nemoto

(10) Patent No.: US 8,413,202 B2
(45) Date of Patent: Apr. 2, 2013

(54) CONTENT RECEPTION APPARATUS, CONTENT TRANSMISSION APPARATUS, AND CONTENT TRANSMISSION AND RECEPTION CONTROL APPARATUS

(75) Inventor: Hiroyuki Nemoto, Nishitokyo (JP)

(73) Assignee: Kabushiki Kaisha Toshiba (JP)

( * ) Notice: Subject to any disclaimer, the term of this patent is extended or adjusted under 35 U.S.C. 154(b) by 112 days.

(21) Appl. No.: 13/006,232

(22) Filed: Jan. 13, 2011

(65) Prior Publication Data

US 2011/0197247 A1 Aug. 11, 2011

(30) Foreign Application Priority Data

Feb. 5, 2010 (JP) ................................. 2010-024527

(51) Int. Cl.
*H04N 7/173* (2011.01)
(52) U.S. Cl. ......... 725/119; 725/115; 725/116; 725/117
(58) Field of Classification Search ........... 725/115–119
See application file for complete search history.

(56) References Cited

U.S. PATENT DOCUMENTS

| 7,203,760 | B2 | 4/2007 | Shimada |
| 2001/0037511 | A1 | 11/2001 | Inagaki |
| 2003/0005447 | A1* | 1/2003 | Rodriguez ....................... 725/51 |
| 2006/0222015 | A1* | 10/2006 | Kafka et al. .................. 370/477 |
| 2010/0064050 | A1 | 3/2010 | Maruhashi et al. |

FOREIGN PATENT DOCUMENTS

| JP | 03-095654 A | 4/1991 |
| JP | 07-143163 A | 6/1995 |
| JP | 2001-309334 | 11/2001 |
| JP | 2002-175276 A | 6/2002 |
| JP | 2002-202927 | 7/2002 |
| JP | 2005-339023 | 12/2005 |
| JP | 2006-229753 | 8/2006 |
| JP | 2007-096720 | 4/2007 |
| WO | WO 2008/059861 | 5/2008 |

OTHER PUBLICATIONS

Japanese Office Action for Japanese Application No. 2011-109176, mailed Jun. 14, 2011 in 7 pages.

* cited by examiner

*Primary Examiner* — Kristine Kincaid
*Assistant Examiner* — Sumaiya A Chowdhury
(74) *Attorney, Agent, or Firm* — Knobbe, Martens, Olson & Bear LLP

(57) ABSTRACT

According to one embodiment, a content reception apparatus includes a communication module and a communication controller. The communication module is configured to communicate with a content transmission and reception control apparatus. The communication controller is configured to communicate with the content transmission and reception control apparatus by the communication module, to receive content transmittable time information of a content transmission apparatus managed by the content transmission and reception control apparatus, to request content managed by the content transmission apparatus based on the content transmittable time information, and to receive the content.

1 Claim, 6 Drawing Sheets

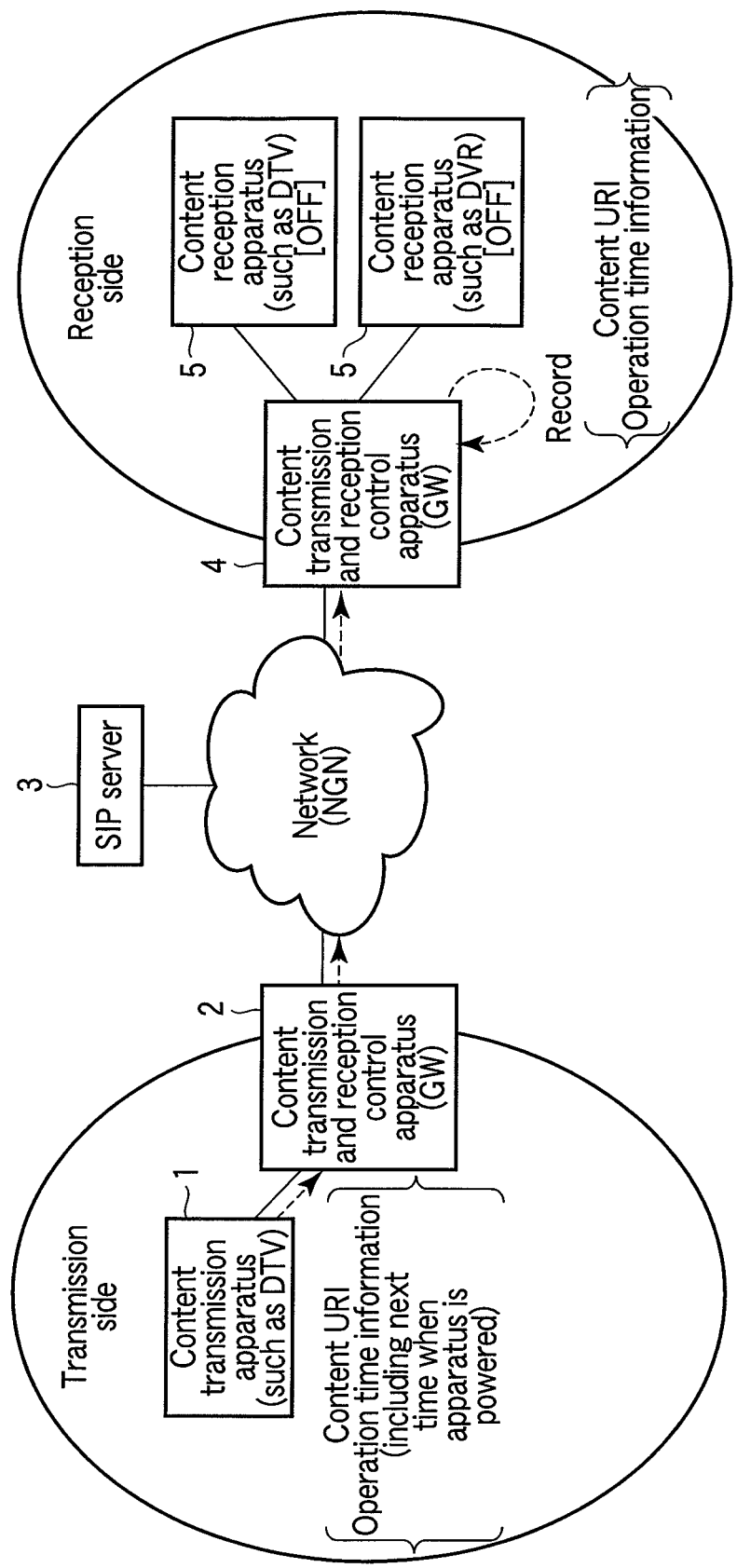
F I G. 1

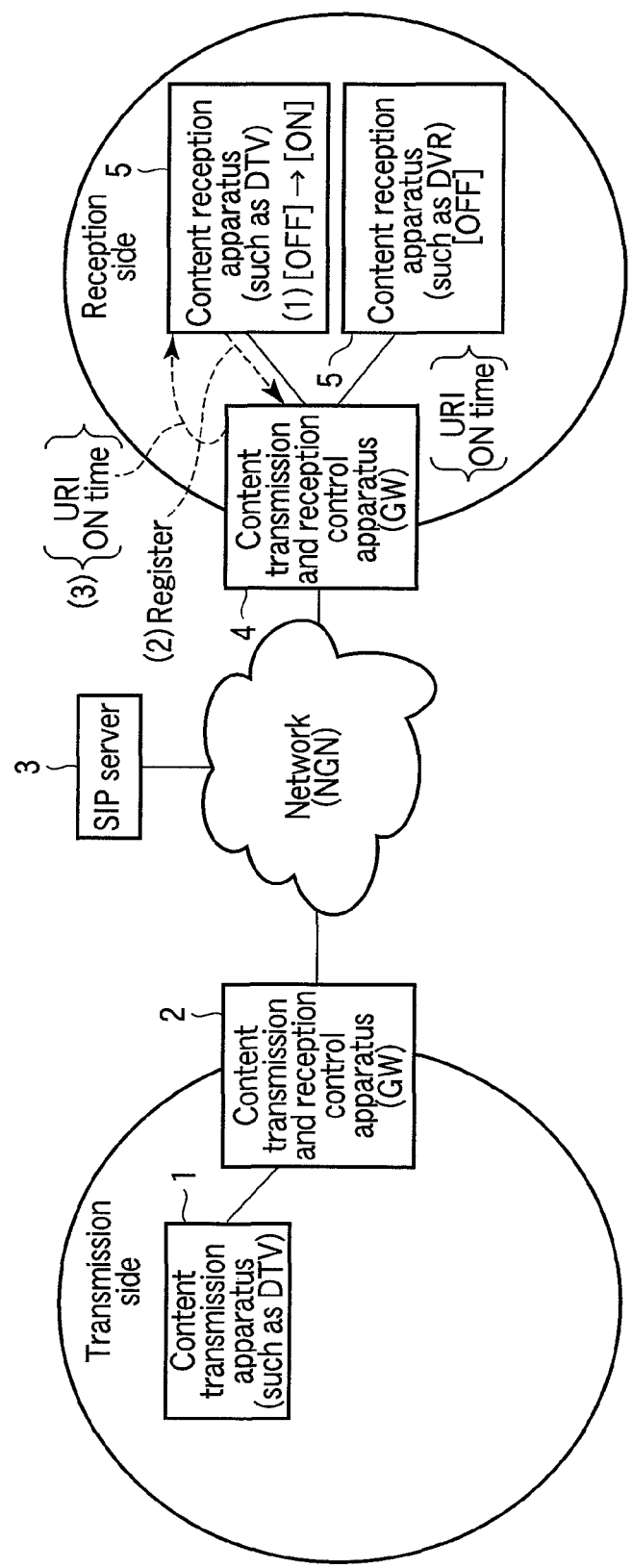
F I G. 2

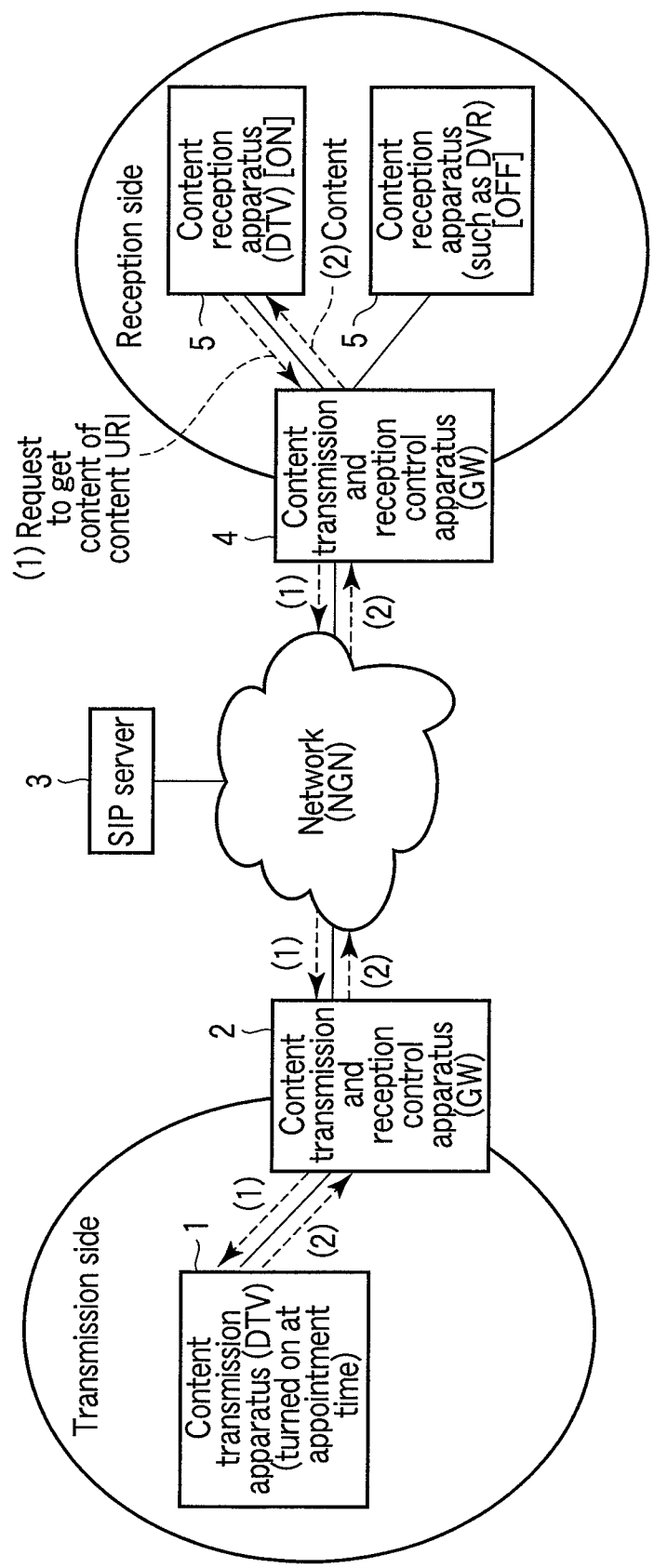
F I G. 3

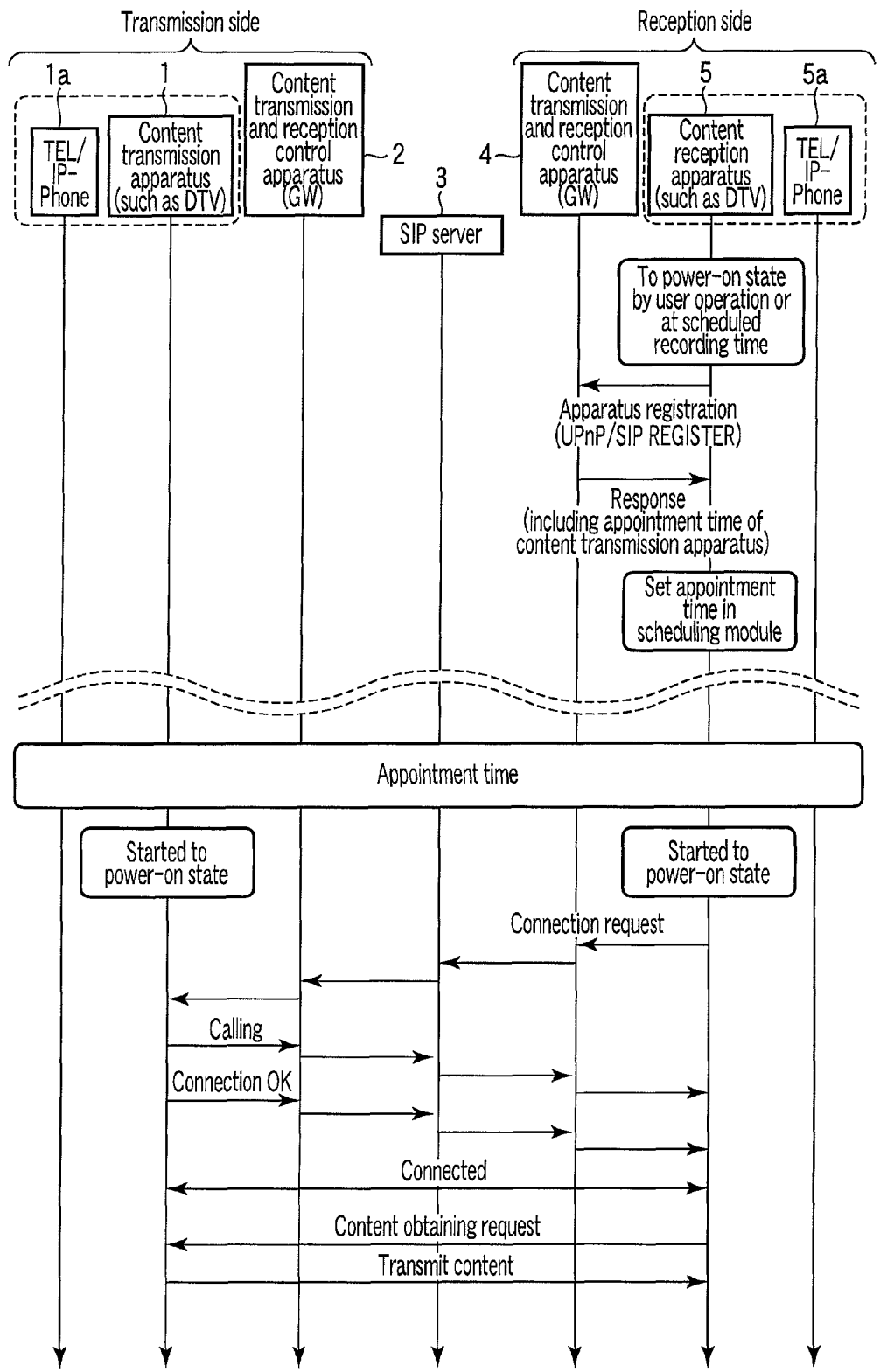
F I G. 5

CONTENT RECEPTION APPARATUS, CONTENT TRANSMISSION APPARATUS, AND CONTENT TRANSMISSION AND RECEPTION CONTROL APPARATUS

CROSS-REFERENCE TO RELATED APPLICATIONS

This application is based upon and claims the benefit of priority from Japanese Patent Application No. 2010-024527, filed Feb. 5, 2010; the entire contents of which are incorporated herein by reference.

FIELD

Embodiments described herein relate generally to a content reception apparatus which receives content transmitted from a content transmission apparatus through a content transmission and reception control apparatus. In addition, the embodiments described herein relate generally to a content transmission apparatus which transmits content to the content reception apparatus through a content transmission and reception control apparatus. Besides, the embodiments described herein relate generally to the content transmission and reception control apparatus.

BACKGROUND

In recent years, content recording and playback apparatuses which can be connected to networks have become widespread. As examples of content recording and playback apparatuses, there are digital televisions (DTVs) and digital video recorders (DVRs). For example, two content recording and playback apparatuses are connected via a network, and one (hereinafter referred to as a "content transmission apparatus") of the content recording and playback apparatuses can transmit content to the other content recording and playback apparatus (hereinafter referred to as a "content reception apparatus").

However, when the content reception apparatus is not operated, the content transmission apparatus cannot transmit content to the content reception apparatus. In such a case, for example, the content transmission apparatus notifies the user of a transmission error, and the user periodically tries re-transmitting the content by the content transmission apparatus. When the content reception apparatus is operated when the user tries re-transmitting the content, the content transmission apparatus can transmit the content to the content reception apparatus.

For example, Jpn. Pat. Appln. KOKAI Pub. No. 7-143163 discloses an electronic mail distribution apparatus which automatically perform delayed distribution of e-mails. By applying such a delayed distribution technique, the content can be subjected to automatic delayed distribution (re-transmission). When the content reception apparatus is operated at the timing of the delayed distribution, the content transmission apparatus can transmit the content to the content reception apparatus.

However, the content reception apparatus is not always operated at the timing of delayed distribution. When the content reception apparatus is not operated at the timing of delayed distribution, the content transmission apparatus cannot transmit the content to the content reception apparatus. Specifically, even when the delayed distribution technique is applied, it is difficult to efficiently improve the above transmission error.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a diagram for explaining an example of content transmission and reception processing performed when a content transmission request is generated in a state where a content reception apparatus is not operated.

FIG. 2 is a diagram for explaining an example of content transmission and reception processing performed when the content reception apparatus is started after the content transmission request is generated.

FIG. 3 is a diagram for explaining an example of content transmission and reception processing performed when content is actually transmitted and received.

FIG. 5 is a diagram for explaining content transmission and reception processing based on the content transmittable time information (operation time information).

DETAILED DESCRIPTION

Various embodiments will be described hereinafter with reference to the accompanying drawings.

In general, according to one embodiment, a content reception apparatus includes a communication module and a communication controller. The communication module is configured to communicate with a content transmission and reception control apparatus. The communication controller is configured to communicate with the content transmission and reception control apparatus by the communication module, to receive content transmittable time information of a content transmission apparatus managed by the content transmission and reception control apparatus, to request content managed by the content transmission apparatus based on the content transmittable time information, and to receive the content.

In the present embodiments, although transmission and reception of a content will be described, it may be transmission and reception of contents. In addition, although the content is assumed to be moving image data such as home video pictures or still image data such as photographs, the content is not limited to these data.

FIGS. 1 to 3 are diagrams illustrating an example of the whole structure of a content transmission and reception system. More specifically, FIG. 1 is a diagram for explaining an example of content transmission and reception processing performed when a content transmission request is generated in a state where a content reception apparatus is not operated. FIG. 2 is a diagram for explaining an example of content transmission and reception processing performed when the content reception apparatus is started after the content transmission request is generated. FIG. 3 is a diagram for explaining an example of content transmission and reception processing performed when content is actually transmitted and received.

Figure 6:
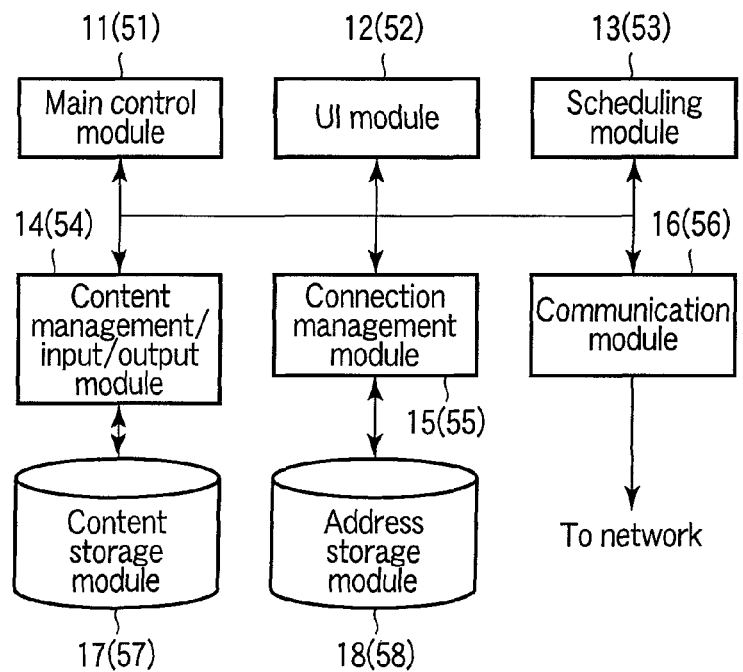
FIG. 6 is a block diagram illustrating an example of the content transmission apparatus or the content reception apparatus.

FIG. 6 is a block diagram illustrating an example of a content transmission apparatus or the content reception apparatus, which is a constituent element of the content transmission and reception system. Although a structure common to the content reception apparatus and the content transmission apparatus is explained in the present embodiments, the structures of the content reception apparatus and the content transmission apparatus may not be completely the same.

The content transmission apparatus 1 and the content reception apparatus 5 are, for example, digital televisions (DTVs) or digital video recorders (DVRs), which can be connected to a network.

The content transmission apparatus 1 comprises a main control module 11, a user interface (UI) module 12, a scheduling module 13, a content management/input/output module 14, a connection management module 15, a communication module 16, a content storage module 17, and an address storage module 18.

The main control module 11 functions as communication controller for controlling content transmission and reception processing. The user interface module 12 receives instructions from the user and the like. The scheduling module 13 manages a content transmission and reception schedule, and controls starting of the main control module 11 and the like. The content management/input/output module 14 manages content stored in the content storage module 17, outputs the content stored in the content storage module 17, and inputs content to the content storage module 17. The connection management module 15 manages addresses stored in the address storage module 18, and connects the content transmission apparatus 1 to an apparatus to be connected to, based on the address. The communication module 16 communicates with a content transmission and reception control apparatus 2.

The content reception apparatus 5 comprises a main control module 51, a user interface (UI) module 52, a scheduling module 53, a content management/input/output module 54, a connection management module 55, a communication module 56, a content storage module 57, and an address storage module 58.

The main control module 51 functions as communication controller for controlling content transmission and reception processing. The user interface module 52 receives instructions from the user and the like. The scheduling module 53 manages a content transmission and reception schedule, and controls starting of the main control module 51 and the like. The content management/input/output module 54 manages content stored in the content storage module 57, outputs the content stored in the content storage module 57, and inputs content to the content storage module 57. The connection management module 55 manages addresses stored in the address storage module 58, and connects the content reception apparatus 5 to an apparatus to be connected to, based on the address. The communication module 56 communicates with a content transmission and reception control apparatus 4.

Figure 7:
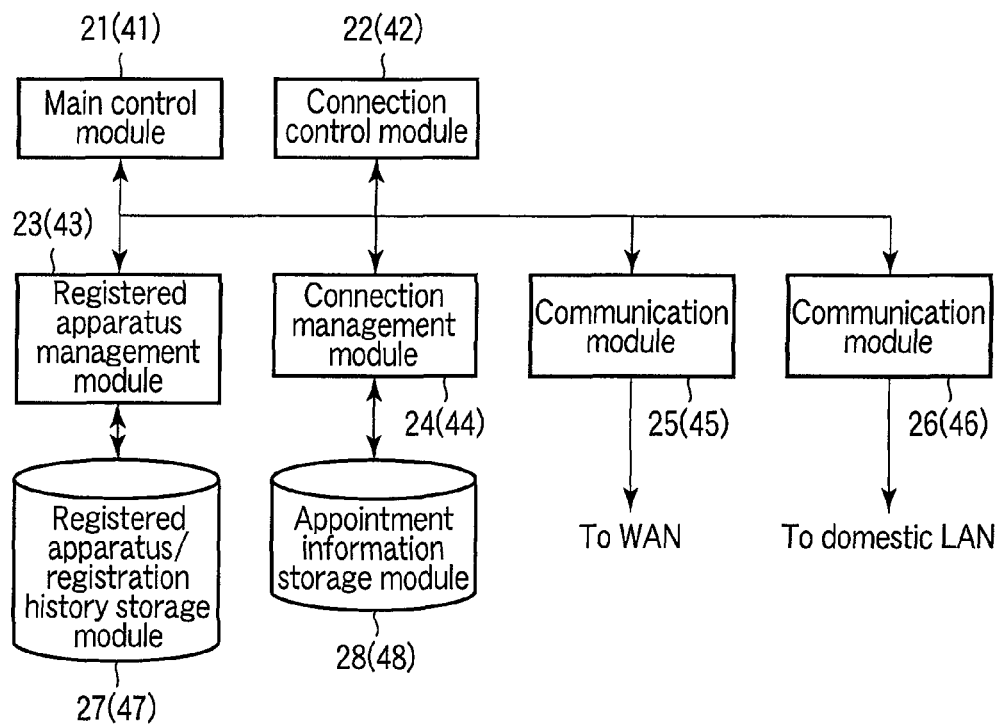
FIG. 7 is a block diagram illustrating an example of a content transmission and reception control apparatus.

FIG. 7 is a block diagram illustrating an example of a content transmission and reception control apparatus (gateway) which is a constituent element of the content transmission and reception system.

As illustrated in FIGS. 1 to 3, the content transmission and reception control apparatus 2 is configured to be capable of communicating with the content transmission apparatus 1, and communicating with a Session Initiation Protocol (SIP) server (network server) 3 via a network, accompanying a telephone session. In addition, the content transmission and reception control apparatus 4 is configured to be capable of communicating with the content reception apparatus 5, and communicating with the SIP server 3 via a network, accompanying a telephone session. The SIP server 3 correlates a telephone number with an IP address based on SIP, and connects a calling apparatus with a called apparatus.

As illustrated in FIG. 7, the content transmission and reception control apparatus 2 has a main control module 21, a connection control module 22, a registered apparatus management module 23, a connection management module 24, a communication module 25, a communication module 26, a registered apparatus/registration history storage module 27, and an appointment information storage module 28.

The main control module 21 and the connection control module 22 function as communication controller for controlling content transmission and reception processing. The registered apparatus management module 23 registers the content transmission apparatus 1 and the like as registered apparatuses in the registered apparatus/registration history storage module 27. The connection management module 24 manages appointment information stored in the appointment information storage module 28. The communication module 25 communicates with the SIP server 3 via a wide area network (WAN). The communication module 26 communicates with the content transmission apparatus 1 via a local area network (LAN).

The content transmission and reception control apparatus 4 includes a main control module 41, a connection control module 42, a registered apparatus management module 43, a connection management module 44, a communication module 45, a communication module 46, a registered apparatus/registration history storage module 47, and an appointment information storage module 48.

The main control module 41 and the connection control module 42 function as communication controller for controlling content transmission and reception processing. The registered apparatus management module 43 registers the content transmission apparatus 5 and the like as registered apparatuses in the registered apparatus/registration history storage module 47. The connection management module 44 manages appointment information stored in the appointment information storage module 48. The communication module 45 communicates with the SIP server 3 via a WAN. The communication module 46 communicates with the content reception apparatus 5 via a LAN.

As illustrated in FIGS. 1 to 3, when the content transmission apparatus 1 transmits content to the content reception apparatus 5, the content transmitted from the content transmission apparatus 1 is transmitted to the content reception apparatus 5, through the content transmission and reception control apparatus 2, the SIP server 3, and the content transmission and reception control apparatus 4.

When the content transmission apparatus 1 transmits content to the content reception apparatus 5 in real time, it is a condition for transmission that the content reception apparatus 5 is in a state of being capable of receiving content. Specifically, it is the condition for transmission that the content reception apparatus is operated. The content transmission apparatus 1 of the present embodiments can efficiently transmit content by time difference transmission, even when the content reception apparatus 5 is not in a state of being capable of receiving content. In addition, the content reception apparatus 5 of the present embodiments can efficiently receive content by time difference reception, when transmission of content is requested when the content reception apparatus 5 is not in the state of being capable of receiving content.

An example of content transmission and reception processing is explained with reference to FIGS. 1 to 5.

Figure 4:
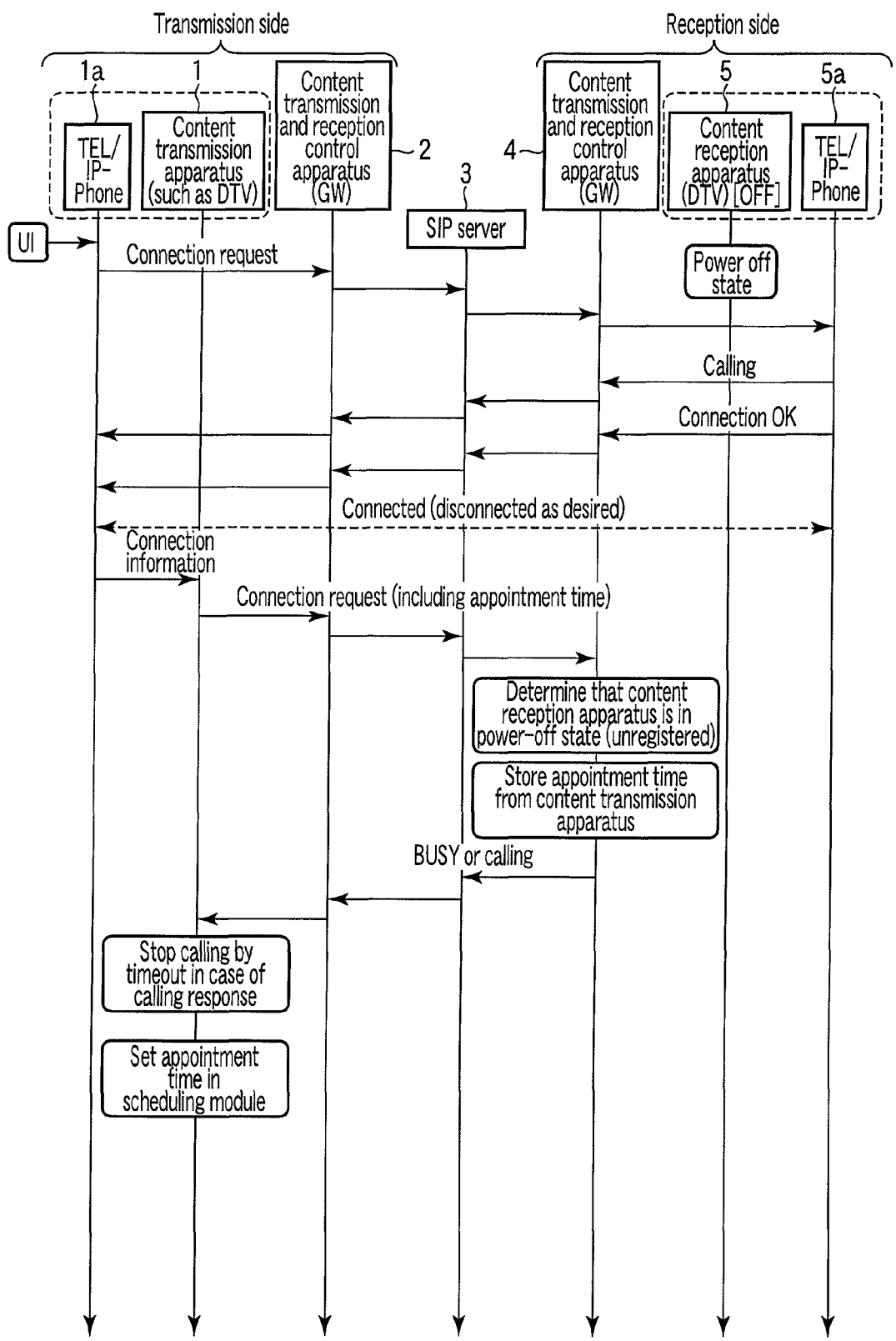
FIG. 4 is a diagram for explaining an example of recording processing of content transmittable time information (operation time information) of a content transmission apparatus.

For example, as illustrated in FIG. 4, a telephone (or IP telephone) 1*a* corresponding to the content transmission apparatus 1, or a telephone (or IP telephone) 1*a* which is formed as one unit with the content transmission apparatus 1 is configured to be capable of communicating with a telephone (or IP telephone) 5a corresponding to the content reception apparatus 5, or a telephone (or IP telephone) 5a which is formed as one unit with the content reception apparatus 5, via a network.

The telephone 5a is notified of a connection request from the telephone 1a to the telephone 5a, though the content transmission and reception control apparatus 2, the SIP server 3, and the content transmission and reception control apparatus 4. The telephone 1a is notified of a connection response (connection is OK) from the telephone 5a to the telephone 1a, through the content transmission and reception control apparatus 4, the SIP server 3, and the content transmission and reception control apparatus 2. After through the above transmission and reception of the connection request and transmission and reception of the connection response, the telephone 1a and the telephone 5a are connected, the content transmission and reception control apparatus 4 and the content reception apparatus 5 are notified of an address of the content transmission apparatus 1, and the content transmission and reception control apparatus 2 and the content transmission apparatus 1 are notified of an address of the content reception apparatus 5.

The registered apparatus management module 23 of the content transmission and reception control apparatus 2 manages the operated state (power-on state) or the stopped state (power-off state) of an apparatus connected to the content transmission and reception control apparatus 2. Specifically, the registered apparatus management module 23 manages the operated state (power-on state) or the stopped state (power-off state) of the content transmission apparatus 1. In the same manner, the registered apparatus management module 43 of the content transmission and reception control apparatus 4 manages the operated state (power-on state) or the stopped state (power-off state) of an apparatus connected to the content transmission and reception control apparatus 4. Specifically, the registered apparatus management module 43 manages the operated state (power-on state) or the stopped state (power-off state) of the content reception apparatus 5. The content transmission and reception control apparatus 2 manages whether an apparatus connected to the content transmission and reception control apparatus 2 is in an operated state or a stopped state, depending on whether the apparatus outputs an SIP REGISTER signal or a UPnP Subscribe signal. In the same manner, the content transmission and reception control apparatus 4 manages whether an apparatus connected to the content transmission and reception control apparatus 4 is in an operated state or a stopped state, depending on whether the apparatus outputs an SIP REGISTER signal or a UPnP Subscribe signal.

For example, when the user interface module 12 of the content transmission apparatus 1 receives a content transmission command, the communication module 16 of the content transmission apparatus 1 issues a connection request to the content reception apparatus 5. Suppose that the above content transmission command is a command to transmit content stored in the content storage module 17 to the content reception apparatus 5 having an address stored in the address storage module 18.

The content transmission and reception control apparatus 4 is notified of the above connection request to the content reception apparatus 5, through the content transmission and reception control apparatus 2 and the SIP server 3. When the registered apparatus management module 43 of the content transmission and reception control apparatus 4 manages the stopped state of the content reception apparatus 5, the connection management module 44 of the content transmission and reception control apparatus 4 registers the connection request in the appointment information storage module 48.

The connection request includes content transmittable time information (operation time information) of the content transmission apparatus 1, and content storage place information (URI of the content transmission apparatus 1). For example, the operation time information is information indicating an operation time schedule of the content transmission apparatus 1, and the operation time information includes operation time zone information determined by the operation start time (for example, the next operation start time) and the operation end time. The operation time information is generated from scheduled program recording information, scheduled program viewing information, and download processing information. For example, operation time information E (18:00-18:10 and 18:58-21:30) is generated from scheduled program recording information A (19:00-20:00), scheduled program recording information B (20:00-21:00), scheduled program viewing information C (21:00-21:30), and download processing information D (18:00-18:10). The download information is information indicating processing of periodically connecting to a network and downloading various information (such as program information).

The connection management module 44 sets a predetermined time included in the content transmittable time zone identified from the content transmittable time information, as appointment time, and the communication module 45 notifies the content transmission apparatus 1 of the appointment time through the SIP server 3 and the content transmission and reception control apparatus 2.

The connection management module 44 not only sets a predetermined time included in the content transmittable time as appointment time, but also can set the whole (including the start time and the end time) of the content transmittable time zone as appointment time. In addition, the communication module 45 may notify the content transmission apparatus 1 of a response "the appointment time is set", not the appointment time.

The communication module 16 of the content transmission apparatus 1 receives the appointment time information, and the scheduling module 13 manages the received appointment time information. In addition, the scheduling module 13 also manages the content transmittable time information (operation time information). The scheduling module 13 starts the main control module 11 and the like based on the content transmittable time information, to control the content transmission apparatus 1 into a content transmittable state.

In addition, as illustrated in FIG. 5, when the user interface module 52 of the content reception apparatus 5 receives an operation command, the main control module 51 and the like are started, and the content reception apparatus 5 comes to a content receivable state (operated state). As another example, when the scheduling module 53 of the content reception apparatus 5 starts the main control module 51 and the like based on scheduled recording information and the like, the content reception apparatus 5 comes to a content receivable state (operated state).

The communication module 56 of the content reception apparatus 5 which has come to the content receivable state notifies the content transmission and reception control apparatus 4 of starting the content reception apparatus 5, and requests the content transmission and reception control apparatus 4 to register the content reception apparatus 5. The communication module 46 of the content transmission and reception control apparatus 4 receives the apparatus registration request from the content reception apparatus 5, and the registered apparatus management module 43 registers the content reception apparatus 5 (being operated). In accordance with this, the communication module 46 transmits content transmittable time information (operation time information) and content storage place information (URI) of the content transmission apparatus 1 included in the connection request transmitted from the content transmission apparatus 1 and stored in the appointment information storage module 48, to the content reception apparatus 5. As another example, the communication module 46 transmits the appointment time included in the content transmittable time zone and the content storage place information (URI), to the content reception apparatus 5.

The communication module 56 of the content reception apparatus 5 receives the content transmittable time information and the content storage place information of the content transmission apparatus 1. As another example, the communication module 56 of the content reception apparatus 5 receives the appointment time and the content storage place information. The scheduling module 53 manages the content transmittable time information of the content transmission apparatus 1 or the appointment time, and starts the main control module 51 based on the content transmittable time information of the content transmission apparatus 1 or the appointment time to control the content reception apparatus 5 into the content receivable state.

As described above, the appointment time is a predetermined time included in the content transmittable time information (operation time information) of the content transmission apparatus 1, and thus at the appointment time the content transmission apparatus 1 is operated. As described above, the content reception apparatus 5 being the other party of communication has received the content transmittable time information (operation time information) of the content transmission apparatus 1 or the appointment time from the content transmission and reception control apparatus, and the scheduling module 53 of the content reception apparatus 5 controls starting of the main control module 51 based on the content transmittable time information or the appointment time. Therefore, at the content transmittable time or the appointment time, the content transmission apparatus 1 comes to the content transmittable state (operated state), and the content reception apparatus 5 comes to the content receivable state (operated state).

The communication module 56 of the content reception apparatus 5 in the content receivable state issues a connection request to the content transmission apparatus 1. The content transmission apparatus 1 is notified of the connection request to the content transmission apparatus 1, through the content transmission and reception control apparatus 4, the SIP server 3, and the content transmission and reception control apparatus 2.

The content transmission apparatus 1 transmits a connection response (connection is OK) in response to the connection request from the content reception apparatus 5. Specifically, the content transmission apparatus 1 transmits a connection response to the content reception apparatus 5, through the content transmission and reception control apparatus 2, the SIP server 3, and the content transmission and reception control apparatus 4. After through the above transmission and reception of the connection request and the transmission and reception of the connection response, the content transmission apparatus 1 and the content reception apparatus 5 are connected.

Thereafter, the communication control module 56 of the content reception apparatus 5 issues a content obtaining request based on the content storage place information. The content transmission apparatus 1 is notified of the content obtaining request including the content storage place information, through the content transmission and reception control apparatus 4, the SIP server 3, and the content transmission and reception control apparatus 2.

In the case where the system is a connection system (call control system) in which the address of the content transmission apparatus 1 being the other party of communication is identified in advance, communication is performed without going through the SIP server 3.

The communication module 16 of the content transmission apparatus 1 receives the content obtaining request, the content management/input/output module 14 reads the content based on the content obtaining request, and the communication module 16 transmits the read content to the content reception apparatus 5. The read content is transmitted to the content reception apparatus 5, through the content transmission and reception control apparatus 2, the SIP server 3, and the content transmission and reception control apparatus 4.

The communication module 56 of the content reception apparatus 5 receives the content transmitted from the content transmission apparatus 1, and the content management/input/output module 54 stores the received content in the content storage module 57.

The content transmission and reception processing of the present embodiments is not limited to the above explanation.

For example, the content transmission apparatus 1 may periodically transmit content transmittable time information (operation time information) to the content reception apparatus 5, and the content reception apparatus 5 may periodically transmit content receivable time information (operation time information) to the content transmission apparatus 1. Thereby, for example, the content transmission apparatus 1 can detect an actual content transmission timing at the point in time when a content transmission request is generated, and can transmit content more efficiently.

As another example, the content transmission apparatus 1 can schedule transmission of content for a time zone with a light traffic, such as daybreak, and in which the content reception apparatus 5 is operated. This structure is effective for transmission of content which is not necessary to be immediately transmitted.

As another example, the content transmission apparatus 1 can receive and register an event date (such as the end and the beginning of the year, and the user's birthday) through the user interface module 12, and transmit content, transmission of which is requested in advance, to be in time for the event date. For example, when it is recognized that the content reception apparatus 5 is not operated on the event date, the content transmission apparatus 1 can transmit the content on the date and time before and closest to the event date.

In addition, when the content transmission apparatus 1 transmits content to the content reception apparatus 5 to back up the content, the content reception apparatus 5 can manage the received content to prevent the received content from being easily deleted. In such a case, the content transmission apparatus 1 transmits content management information together with the content to the content reception apparatus 5. The content management information includes information indicating that the content is backup data. The content reception apparatus 5 receives the content management information together with the content, and detects that the received content is backup data, based on the content management information. When the content reception apparatus 5 receives an instruction to delete the received content through the user interface module 52, the content management/input/output module 54 outputs a warning or the like. In response to the output of the warning, for example, displayed is a message "when the content is deleted, your backup content stored in the content transmission apparatus 1 is also deleted".

According to the present embodiments described above, the content transmission apparatus 1 can efficiently transmit content to the transmission reception apparatus 5 by time-difference transmission, even when the content reception apparatus 5 is not operated. In addition, the content transmission and reception processing of the present embodiments can be achieved, without changing the existing hardware or increasing the power consumed when the apparatuses are in a waiting state. Besides, since content can be transmitted and received in a time zone in which traffic of the network is light, the load on the network can be reduced or distributed. Thereby, it is possible to efficiently transmit and receive a number of contents and content of a large volume.

Although the above explanation shows a case where content is transmitted and received between the content transmission apparatus 1 and the content reception apparatus 5 through the content transmission and reception control apparatus 2, the SIP server 3, and the content transmission and reception control apparatus 4, the content transmission apparatus 1 and the content reception apparatus 5 can transmit and receive content without through the content transmission and reception control apparatus 2, the SIP server 3 and the content transmission and reception control apparatus 4, when the content transmission apparatus 1 recognizes the address of the content reception apparatus 5 or the content reception apparatus 5 recognizes the address of the content transmission apparatus 1.

The various modules of the embodiments described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A content transmission and reception control apparatus comprising:
   a communication module configured to relay communication between a content transmission apparatus and a content reception apparatus;
   a communication controller configured to communicate with the content transmission apparatus by the communication module, to receive a connection request including content transmittable time information of the content transmission apparatus, to transmit the connection request including the content transmittable time information to the content reception apparatus, in response to notification of starting from the content reception apparatus, to receive a transmission request of content based on the content transmittable time information from the content reception apparatus, to transmit the transmission request of the content to the content transmission apparatus, to receive the content transmitted from the content transmission apparatus, and to transmit the content to the content reception apparatus; and
   a memory configured to store the connection request including the content transmittable time information,
   wherein the communication controller receives the connection request including storage place information of the content from the content transmission apparatus, receives the transmission request of the content of the storage place information from the content reception apparatus, transmits the transmission request of the content of the storage place information to the content transmission apparatus, and receives the content of the storage place information transmitted from the content transmission apparatus in response to reception of the transmission request of the content of the storage place information at the content transmission apparatus,
   wherein the communication controller receives the connection request including the content transmittable time information from the content transmission apparatus even when the content reception apparatus is unable to receive, waits for a transmission request of the content from the content reception apparatus, receives the transmission request of the content from the content reception apparatus, transmits the transmission request of the content to the content transmission apparatus, and receives the content of the storage place information transmitted from the content transmission apparatus in response to reception of the transmission request of the content of the storage place information at the content transmission apparatus.

* * * * *